A. B. DAVIS.
Improvement in Devices for Locking Nuts.
No. 122,999. Patented Jan. 23, 1872.
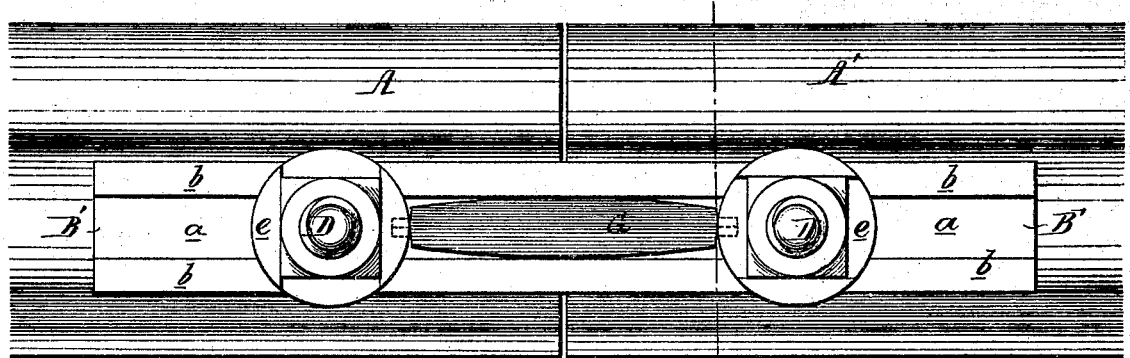
FIG. 4.
FIG. 5.   FIG. 2.
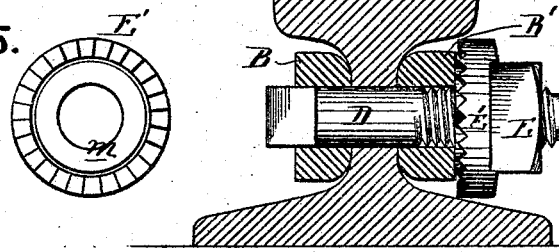
FIG. 3.
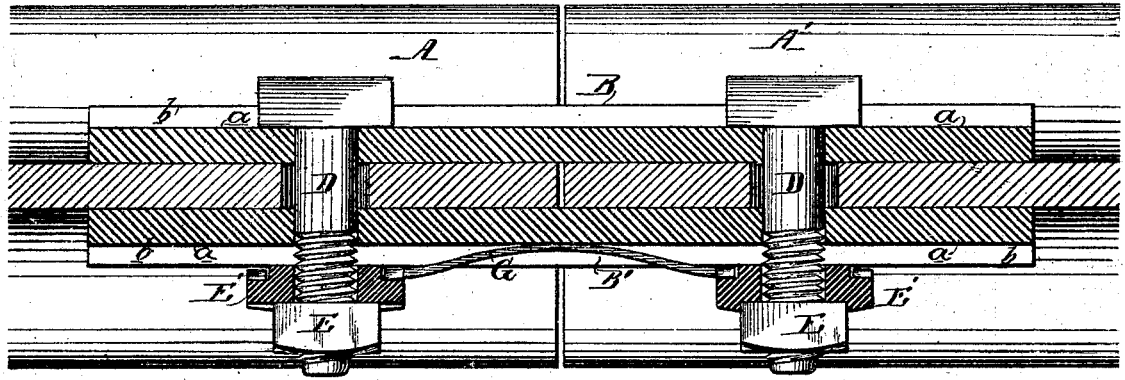
Witnesses, Jno. B. Harding, Thos. McIlvain
Augustus B. Davis
by his Atty.
Howson and Son.

122,999

UNITED STATES PATENT OFFICE.

AUGUSTUS B. DAVIS, OF PHILADELPHIA, PENNSYLVANIA.

IMPROVEMENT IN DEVICES FOR LOCKING NUTS.

Specification forming part of Letters Patent No. 122,999, dated January 23, 1872.

Specification describing Improvements in Securing Railroad Rails and other objects, invented by AUGUSTUS B. DAVIS, of Philadelphia, county of Philadelphia and State of Pennsylvania.

My invention consists of bolts having nuts constructed in the peculiar manner fully described hereafter, so that by the aid of a spring-catch they will be prevented from becoming loose by the jarring action of the object to which they are applied, the nuts at the same time admitting of being turned with an ordinary wrench. My invention further consists in the combination, described hereafter, of the said bolts and nuts with a splicing-bar of two adjoining rails.

In the accompanying drawing, Figure 1 is a side view of the ends of two adjoining rails, illustrating my invention as applied to the same; Fig. 2, a transverse section on the line 1 2, Fig. 1; Fig. 3, a sectional plan; Fig. 4, a detached view of the spring connected with my invention; and Fig. 5, a face view of the nut.

A and A' are the ends of two adjoining rails, to the webs of which are fitted the splicing-bars B and B', bolts D D passing through these bars and through the rail. The splicing-bars are of rolled iron, and each has a longitudinal groove or channel, a, bounded on the edges by ribs b b, the T-heads of the bolts D fitting into the channel of one bar and the nuts of the bolts bearing against the ribs b b of the opposite bar, as best observed in Fig. 3. The nut is, in the present instance, made in two parts—the nut proper E and the disk E', the latter having a recess, e, for receiving a part of the former. On the rear face of the disk, at and near the edge of the same, is formed an annular rack, m, within which is an annular projection, n, the latter only bearing against the ribs of the splicing-bar, the teeth of the rack being free from contact with the same. The bent middle portion of a spring, G, fits freely between the ribs of the splicing-bar, and one end of this spring is adapted to the teeth of the rack of one disk and the other end to the teeth of the other disk, as seen in Fig. 3. When the nuts are screwed home the opposite ends of this spring are forced toward the splicing-bar, and the spring consequently prevents the nuts from becoming loosened by the jars to which the rails are subjected. The teeth of the disks and the ends of the springs, however, are so formed in respect to each other that when it becomes necessary to tighten the nuts or unscrew the same the spring will yield to the effort exerted to turn the nut by an ordinary wrench. The ends of the spring, however, will catch in whatever space between the teeth is presented to them when the nut is turned, and will always act as a retainer of the nut. In other words, while the springs offer no impediment to the turning of the nuts with a wrench, they retain the nuts with sufficient effect to resist that jarring action of the rails which has always a tendency to gradually loosen the nuts.

One of the advantages of my invention as applied to rail-couplings is that the spring requires no fastening, for it is retained in its proper position longitudinally by the teeth of the disk, while the ribs of the splicing-bar retain it in its proper vertical position.

I prefer to make the nuts in two parts, as shown, for the following reasons: First, the disk, with its rack, can be made of ordinary cast-iron at a cheap rate, and can be sold for application to the wrought-iron nuts, which, being of the usual construction, require no alteration; and second, the nuts can be applied to and turned on the bolts more easily when detached from the disks, the spring offering no impediment to the turning of the nuts by the fingers until the nut approaches its destination and reaches the disk, when the latter becomes a part of the nut, further turning of which demands the aid of a wrench.

It should be understood that the bolt passes freely through the disk, the nut only being threaded. The nut, however, can be made in one piece, either of malleable cast-iron or of ordinary wrought-iron, the teeth in the latter case being stamped on the back of the nut.

It will be evident that my invention is applicable to the securing of any objects the jarring of which is apt to loosen the nuts of ordinary bolts, and that as neither the nut or disk requires to be bent, indented, or altered in any manner to effect the fastening they will not deteriorate from constant use and repeated adjustment.

It will be seen that, the teeth at the under side of the nut or disk being inclined at both sides, the nut can be turned in either direction without its being necessary to manipulate the catch.

I claim as my invention—

1. The combination of a channeled bar, bolts, and ratchet-nuts and a spring, G, adapted to the bar and to the nuts, as set forth.

2. The nut, consisting of the threaded portion E and disk E' fitted to the part E, and having at the inner face teeth inclined at both sides, as and for the purpose described.

In testimony whereof I have signed my name to this specification in the presence of two subscribing witnesses.

AUG. B. DAVIS.

Witnesses:
  WM. A. STEEL,
  JOHN K. RUPERTUS.